United States Patent [19]

Biliris et al.

[11] Patent Number: 5,590,327
[45] Date of Patent: Dec. 31, 1996

[54] METHOD FOR MAKING DATA OBJECTS HAVING HIDDEN POINTERS PERSISTENT

[75] Inventors: Alexandros Biliris, Arlington, Mass.; Shaul Dar, Madison, Wis.; Narain H. Gehani, Summit, N.J.

[73] Assignee: Lucent Technologies Inc., Murray Hill, N.J.

[21] Appl. No.: 343,735

[22] Filed: Nov. 22, 1994

Related U.S. Application Data

[63] Continuation of Ser. No. 40,327, Mar. 30, 1993, abandoned.
[51] Int. Cl.$^6$ ........................................................ G06F 9/00
[52] U.S. Cl. ........................................................ 395/670
[58] Field of Search ........................ 395/375, 600, 395/650, 700

[56] References Cited

U.S. PATENT DOCUMENTS

| | | | |
|---|---|---|---|
| 4,638,426 | 1/1987 | Chang et al. | 395/400 |
| 4,814,971 | 3/1989 | Thatte et al. | 395/575 |
| 4,853,842 | 8/1989 | Thatte et al. | 395/425 |
| 5,293,630 | 3/1994 | Tatge et al. | 395/700 |
| 5,297,279 | 3/1994 | Bannon et al. | 395/600 |

OTHER PUBLICATIONS

R. Agrawal et al., "ODE (Object Database and Environment): The Language and the Data Model", Proc. ACM-SIGMOD 1989 Int'l Conf. Management of Data, Portland, Oregon, May–Jun. 1989, 36–45.
O. Deux, et al., "The O$_2$ System", Communications of the ACM, vol. 34, No. 10, Oct. 1991, 35–48.
C. Lamb, et al., "The ObjectStore Database System", Communications of the ACM, vol. 34, No. 10, Oct. 1991, 50–63.
J. E. B. Moss, "Working with Persistent Objects: To Swizzle or Not to Swizzle", IEEE Transactions on Software Engineering, vol. 18, No. 8, Aug. 1992, 657–673.
J. E. Richardson et al., "Persistence in the E Language: Issues and Implementation", Software–Practice & Experience vol. 19, No. 12, Dec. 1989, 1115–1150.

P. R. Wilson, "Pointer Swizzling at Page Fault Time: Efficiently Supporting Huge Address Spaces on Standard Hardware", University of Illinois at Chicago Technical Report UIC–EECS–90–6, Dec. 1990.
R. Agrawal, N. H. Gehani, "Rationale for the Design of Persistence and Query Processing Facilities in the Database Programming Language O++", 2nd Int'l Workshop on Database Programming Languages, Portland, OR, Jun. 1989, 25–40.
A. Biliris, "An Efficient Database Storage Structure for Large Dynamic Objects", Proc. IEEE 8th Int'l Data Engineering Conference 1992, Phoenix, Arizona, Feb. 1992, 301–308.
B. Stroustrup, "Sixteen Ways to Stack a Cat", Proc. USENIX Winter Conf., 1991.
J. E. Richardson et al., "Persistence In The E Language: Issues and Implementation," Software–Practice And Experience, vol. 19(12), Dec., 1989, pp. 1115–1150.

Primary Examiner—Kevin A. Kriess
Attorney, Agent, or Firm—Kenneth M. Brown

[57] ABSTRACT

A method for making data objects having hidden pointers persistent is disclosed. A pre-existing process for creating data objects is modified so as to selectively inhibit both the allocation of memory space for the data object and the initialization of data within the data object. A data object with hidden pointers created by a previous program invocation is retrieved into memory by a subsequent program invocation. The modified object creation process is then advantageously applied to the data object. As a result, the hidden pointers within the data object are initialized without allocating new memory or disturbing the data within the data object. Where the object creation process includes the execution of a user supplied initialization function, the initialization function is modified so as to inhibit the initialization of data within the data object. A global flag is set by the object creation process and tested within the initialization function. If the initialization function finds the flag to be set, execution of the data initialization code is avoided.

22 Claims, 3 Drawing Sheets

METHOD FOR MAKING DATA OBJECTS HAVING HIDDEN POINTERS PERSISTENT

This application is a continuation of application Ser. No. 08/040,327, filed on Mar. 30, 1993 now abandoned.

FIELD OF THE INVENTION

The present invention relates generally to the field of computer programming languages and more specifically to object-oriented programming languages such as C++.

BACKGROUND OF THE INVENTION

Object-oriented programming languages have become increasingly popular since the introduction of the C++ programming language in the mid 1980's. C++ has become the programming language of choice for many in the scientific and engineering disciplines, and has become widely known and used in the field of computer science as well. The syntax and semantics of C++ is described in detail in numerous reference books and manuals.

As used in object-oriented programming, a data "object" is a particular item of data of a specified type. For example, a given program variable may contain an object which is data of type integer. Most programming languages provide for a set of predefined data types, such as integers, real numbers, characters, arrays, pointers, etc. Object-oriented programming languages, however, enable the user (i.e., the programmer) to define new, additional data types.

In C++, a user-defined data type is known as a "class." A class is a set of named data elements (data members) and a set of operations (member functions) designed to manipulate that data. A "class object" is a particular item of data of a particular class.

Object-oriented programming extends the concept of abstract data types to allow relationships to be established between types and "subtypes." This is achieved through a mechanism referred to as "inheritance," a primary characteristic of object-oriented programming. Rather than re-implementing shared characteristics, a class can inherit the data members and member functions of other classes. In C++, for example, inheritance is implemented through the mechanism of "class derivation." One class, known as the "derived class," may inherit the data and functions from another class, known as the "base class." In this manner, an object of the derived class has the characteristics of the base class and, therefore, the derived class can be viewed as a "subtype" of the base class.

A "virtual function" in C++ is a special member function invoked through a base class reference (or pointer), which is bound dynamically at execution (or "run") time. C++ allows a base class pointer to refer not only to an object of its own class, but, alternatively, to a derived class object instead. When a function specified as "virtual" is invoked using such a pointer, the specific function that is called depends on the actual class type of the referenced object. The specific version of the named function which is invoked is one which has been defined by the user to be appropriate to the actual data types (i.e., classes) of the argument or arguments being passed to the function. It is typically a task of the C++ compiler to generate code that will invoke the appropriate function. Selection of the appropriate specific virtual function is desirably transparent to the user.

A "virtual base class" in C++ permits overriding of a default inheritance mechanism. They allow the user to specify a base class to be shared when that base class would otherwise occur more than once in the derivation hierarchy. In particular, a class may be derived from a plurality of other classes, and more than one of these classes may, in turn, be derived from a common base class. Since the default inheritance mechanism uses a tree derivation hierarchy structure, such a derived class will result in the generation of a separate instance of the base class data for each of the multiple occurrences of the common base class. Such multiple instances of what is typically intended as the same data item representing the same information may result in unwanted ambiguity. The use of virtual base classes will avoid this ambiguity.

In C++, the internal system representation of data objects which include virtual functions or virtual base classes contain "hidden" memory pointers which are used for implementing these facilities. In the case of virtual functions, the hidden pointers point to virtual function tables which are used to determine which particular functions are to be called. In the case of virtual base classes, the hidden pointers are used to point to the shared occurrence of a common base class. These pointers are generated by the C++ compilers; they are hidden in that they have not been specified by the user. Therefore, the user typically has no mechanism in C++ by which to directly manipulate their values. Even though these pointers are part of a user created data object, the contents of these pointers cannot be modified by the user. Moreover, the pointers are "volatile" since the location in memory to which they point is only meaningful during the current invocation of the executing program. In other words, the pointers remain valid only for the duration of the program invocation which created them.

It is often advantageous to write data to a mass storage device such as a disk for later retrieval. In many cases it is a different program or a subsequent invocation of the same program which will retrieve the data. For example, a database management program will likely maintain one or more files on disk which contain a collection of data objects which may be retrieved and manipulated by a subsequent invocation of the program. Thus, it is necessary for proper functionality of such an application that the data stored on disk remains valid across multiple program invocations. Data which remains valid across multiple program invocations is called "persistent" data (as opposed to volatile data whose validity is limited to the current invocation of the executing program which created it).

If the data objects stored on disk contain hidden pointers, they will not be directly usable :if read into memory by a different program or by a subsequent invocation of the same program These data objects will be volatile. The hidden pointers may not only contain inaccurate address data in the subsequent invocation, but their use will likely result in illegal memory references. Moreover, the user has no direct mechanism with which to modify these pointers to make them valid, such that they will point to the appropriate information (e.g., virtual function table or shared base class data) in the memory space of the subsequent program invocation.

Such concerns might be addressed by changing the semantics of the C++ language. Alternatively, modifications might be made to the language compiler to alleviate this problem. Such solutions, however, require that the extremely large installed base of C++ compilers and/or C++ programs be modified. Such modifications could adversely effect existing C++ programs and could create incompatibilities between object programs compiled using compilers that differ in this respect. Moreover, such solutions would require the redistribution of many copies of the modified compiler. It would therefore be advantageous to provide a mechanism by which data objects containing hidden pointers can be made persistent without the need to make changes in the semantics of object-oriented languages such as C++.

SUMMARY OF THE INVENTION

The present invention provides a method for allowing data objects with pointers to become persistent. An invalid pointer in a data object is changed to refer to a correct location in memory. According to an illustrative embodiment, a modified version of the pre-existing process used to create data objects is produced. This modified process inhibits both the allocation of memory space for the data object and the initialization of data within the data object. Then, upon subsequent retrieval of the given data object, e.g., by a subsequent program invocation, this modified version of the object creation process is advantageously applied to the data object. As a result, hidden pointers are appropriately initialized without allocating new memory or disturbing the data members within the data object.

In accordance with this illustrative embodiment, the programming language used is C++, the object creation process is the new operator, and the modified version of the object creation process is produced by overloading the new operator to define a new version thereof.

Also in accordance with this embodiment, the object creation process may include the execution of a user-defined function to initialize data members within the object. The user-defined initialization function is advantageously modified so as to inhibit the initialization of data when it is invoked by the modified version of the object creation process. This may be accomplished by setting a global flag variable in the object creation process. That variable is then advantageously tested by the initialization function. If the flag is set, the initialization of the data members is avoided.

BRIEF DESCRIPTION OF THE DRAWINGS

FIGS. 2–5 illustrate typical memory representations of the data objects of FIG. 1 in an implementation of the C++ programming language.

DETAILED DESCRIPTION

Introduction

Figure 1:
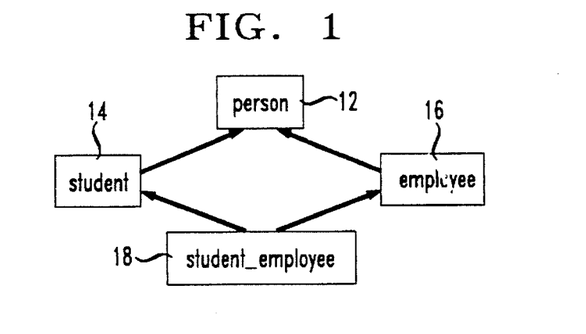
FIG. 1 shows a user-defined data type hierarchy illustrative of the derived class capability provided by object oriented programming languages such as C++.

FIG. 1 shows a user-defined data type hierarchy illustrative of the derived class capability of the C++ programming language. Class person 12 is a base class of both class student 14 and class employee 16, each of which is, correspondingly, a derived class from class person 12. Class student 14 and class employee 16 (as well as class person 12) are base classes of class student_employee 18. These types are illustratively defined via the C++ type definition facility known as the class.

Class declarations consist of two parts, a specification and a body. The class specification includes a declaration of the data members (also known as attributes) and the member functions (also known as methods) of the class. The class body consists of the bodies (e.g., the executable code) of functions declared in the class specification but whose bodies were not given there.

The Use of Virtual Functions in C++

As described above, virtual functions in C++ provide a mechanism by which the specific function to be invoked by a function call is determined at run time based on the actual type of the data being passed to the function. This capability is particularly advantageous because C++ allows a base class pointer (or reference) to refer to a derived class object. For example, in the hierarchy of FIG. 1, a person pointer can refer to a student object. When a virtual function with a given name is invoked using this pointer, the specific version of that function that is called depends on the data type of the referenced object. It is, of course, the task of the C++ compiler to generate code that will invoke the appropriate function.

The following C++ code illustrates a C++ definition of the class hierarchy of FIG. 1:

```
class person {
public:
    char firstname[MAX];
    char lastname[MAX];
    int age;
    virtual void print();
};
class student: virtual public person {
public:
    char university[MAX];
    virtual void print();
};
class employee: virtual public person {
public:
    char company[MAX];
    int salary;
    virtual void print();
};
class student_employee: public employee,
                                        public student {
public:
    int maxhours;
    virtual void print();
};
```

In the above code, the specifications for each of the four classes declares one or more data members. Each specification also includes the declaration of a virtual function with the name print. In particular, class person is declared to include three data members (a first name, a last name, and an age), and an as yet unspecified version of a virtual function named print. Class student is declared to include one data member (a university name) in addition to those included in its base class person, as well as an as yet unspecified version of a member function named :print. Class employee is declared to include two data members (a company name and a salary) in addition to those included in its base class person, as well as an as yet unspecified version of a member function named print. And class student_employee is declared to include one data member (a maximum number of working hours) in addition to those included in each of its base classes, class employee and class student, as well as an as yet unspecified version of a member function named print.

In the above code, each base class is declared to be a virtual base class. As described above, this declaration ensures that only one copy of the data members of the base class appears in each instance of any derived class. The virtual base class is shared by all the components of the inheritance hierarchy that specify the given class as a virtual base class. Declaring a base class as virtual has no effect with single inheritance (as in the above examples of class employee and class student), but does make a difference in the case of multiple inheritance (as in the above example of class student_employee).

The following C++ code illustrates definitions of the virtual function print, as might be provided for each of the four classes defined in the above code:

```
void person::print()
{
    cout << firstname << " " << lastname
                 << ", age = " << age << endl;
}
void student::print()
{
    person::print();
    cout << "student at " << university << endl;
}
void employee::print()
{
    person::print();
    cout << "employed at " << company << endl;
}
void student_employee::print();
{
    person::print();
    cout << "student at " << university << endl;
    cout << "employed at " << company << endl;
}
```

In the above code a version of virtual function print is defined for each class which appropriately prints out relevant information regarding the data object which is passed to it as an argument. Such relevant information includes name and age for the class person, name, age and university for the class student, name, age and company for the class employee, and name, age, university and company for the class student_employee. When invoking print through a pointer (or reference) which has been declared to be a pointer to an object of type person, the actual virtual function to be called will be determined at run time according to the actual type of the referenced object. For example, consider the following program code which illustrates the use of the print virtual function:

```
main()
{
    person *pp = new person;
    student *ps = new student;
    ...
    pp->print();
    ps->print();
    ...
    pp = ps;
    pp->print();
    ...
}
```

The first pp->print function call in the above program invokes the print function defined for class person, since pp points to a person object. As a result, name and age information will be printed by the version of the virtual function print defined for class person. Similarly, the ps->print function call invokes the print function of class student. However, the second pp->print function call invokes the print function of class student even though the declared data type of pp is a pointer to person, because pp was assigned a pointer to a student object in the preceding line of code.

The Use of Virtual Base Classes in C++

As described above, the purpose of virtual base classes is to allow the sharing of base class data members in cases of multiple inheritance. In the above example, class person is a virtual base class of both the student class and the employee class, and class student_employee is derived from both the student class and the employee class. For each base class of a derived class object, it is necessary for a portion of the representation of the derived class object to be devoted to the representation of the data associated with that base class. For example, a student object includes a person "sub-object," as does an employee object. Furthermore, a student_employee object includes both a student sub-object and an employee sub-object. However, class person is a virtual base class of both class student and class employee. Therefore, every student_employee object should advantageously contain only one instance of class person instead of two. Both the employee sub-object and the student sub-object will share this instance of person.

Consider the following C++ program code:

```
main()
{
    student_employee *se;
    int a, b;
    ...
    se->student::age = a;
    ...
    se->employee::age = b;
    ...
}
```

Because se->student and se->employee share the same person sub-object (since the person base class was declared to be a virtual base class of each), se->student::age and se_>employee::age both refer to the same data component, i.e., se->person::age. Therefore, the C++ implementation must ensure that these data items are, in fact, one and the same.

C++ Implementation of Virtual Functions and Virtual Base Classes

Figure 2:
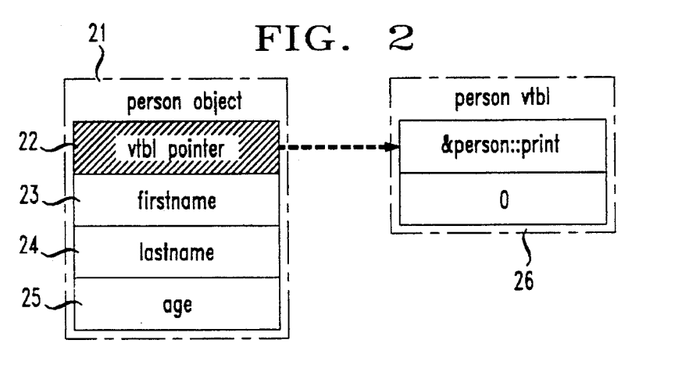
FIG. 2 shows the memory layout of a person object.
Figure 3:
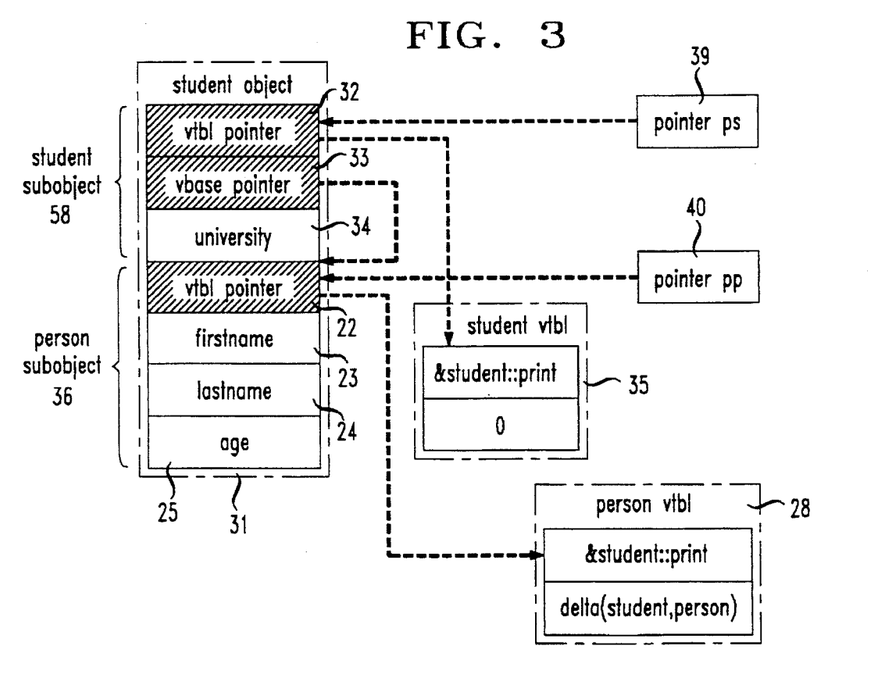
FIG. 3 shows the memory layout of a student object.
Figure 4:
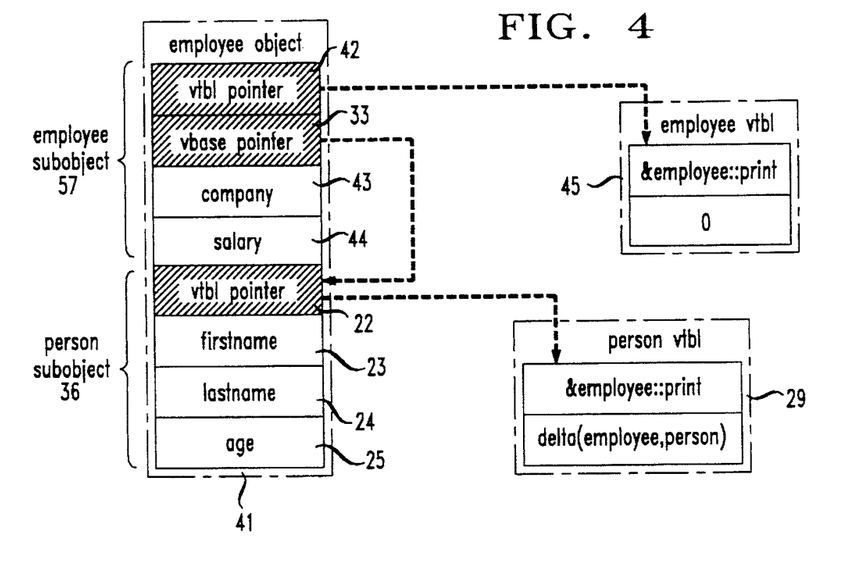
FIG. 4 shows the memory layout of an employee object.
Figure 5:
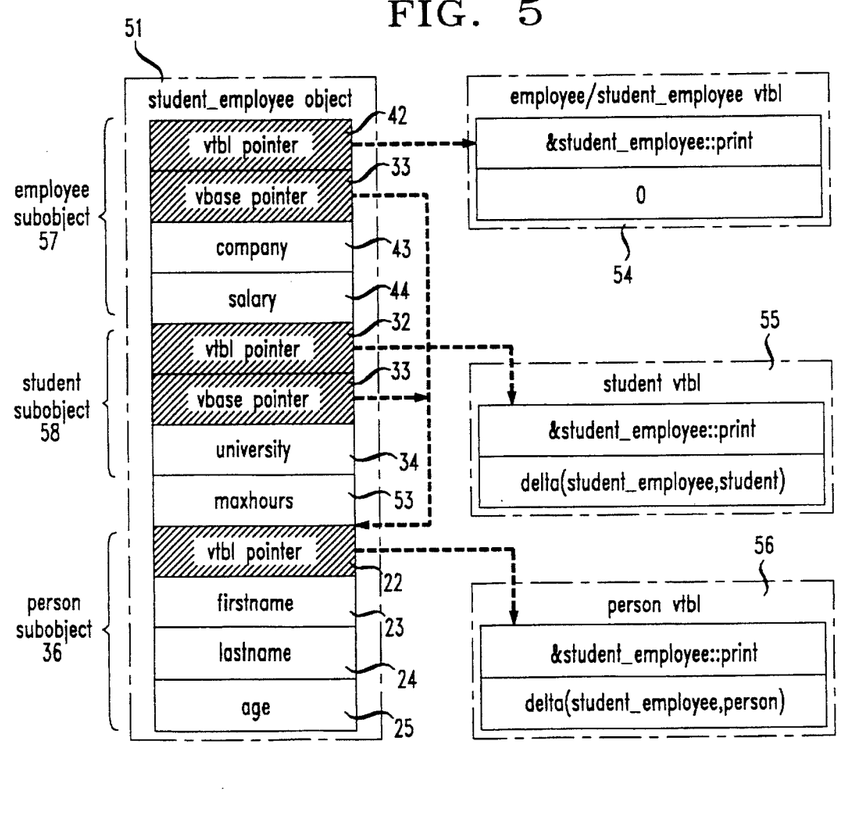
FIG. 5 shows the memory layout of a student_employee object.

FIGS. 2–5 illustrate the memory representations of an object of the type of each of the four above-defined classes in a typical C++ implementation. FIG. 2 shows the memory allocation for a person object. FIG. 3 shows the memory allocation for a student object. FIG. 4 shows the memory allocation for an employee object. And FIG. 5 shows the memory allocation for a student_employee object.

As can be seen from the illustrations, each object of a class that has virtual functions contains a hidden pointer that points to a virtual function table, called the vtbl. The vtbl contains the addresses of the specific virtual functions to be called for the given object. In the case of derived class objects, the vtbl of a base class sub-object also contains offsets (deltas) that are used to find the address of the derived class object given the address of the base class sub-object.

In FIG. 2, vtbl pointer 22 is the first entry in the memory layout of person object 21. Also included in the memory layout are, of course, the entries for the data members of the class, firstname 23, lastname 24 and age 25. Vtbl pointer 22 points to person vtbl 26, which contains the address of the specific version of the virtual function which is to be invoked when the given named function (i.e., print) is applied to this object, namely &person::print.

In FIG. 3, the memory layout of student object 31 is shown. The first portion of the layout comprises data specific to the class student. It begins with vtbl pointer 32 which points to student vtbl 35. Next, the layout includes vbase pointer 33. Since person is declared as a virtual base class of student, references to the person component of a student object are resolved by an indirection through a pointer. This pointer is called the vbase pointer. Note that vbase pointer 33 in FIG. 3 points to the second portion of the layout of student object 31, namely person sub-object 36. In particular, person sub-object 36 comprises vtbl pointer 22 which points to person vtbl 28, and the entries for the data members of the person sub-class, namely firstname 23, lastname 24 and age 25. After vbase pointer 33 and before person sub-object 36, the memory layout of student object 31 includes the single specific data member of class student, university 34.

Student vtbl 35 contains the address of the appropriate version of the print function which is to be called when it is invoked with student object 31 as its argument, namely&student::print. In addition, person vtbl 28 not only contains the address&student::print, but also contains the offset that is used to find the address of the derived class object (student object 31), given the address of the sub-object (person sub-object 36). Specifically, each vtbl for a base sub-class contains an offset representing the relative location of the sub-object in the memory layout of the derived object. For example, person vtbl 28 includes the value delta (student, person), which is equal to the difference between the address of vtbl pointer 22 and vtbl pointer 32 in student object 31.

When a pointer which has been declared to be a pointer to an object of a base class type is assigned to point to an object of a derived class type, the pointer must point to the base class sub-object within the derived class object. Otherwise, the semantics of C++ would be violated. For example, after the assignment "pp=ps;" in the above illustrated program code, the pointer pp 40 (declared as a pointer to a person object) is pointing to the head of person sub-object 36, while the pointer ps 39 (declared as a pointer to a student object) is pointing to the head of student object 31.

Subsequent to the execution of the assignment "pp=ps;" in the illustrated program code, the function call "pp->print();" is executed. Since pointer pp 40 points to person sub-object 36, this call requires an indirection via vtbl pointer 22 to person vtbl 28. The address of the appropriate function, namely&student::print will be retrieved from person vtbl 28. However, student:::print: requires that it receive the address of a student object as its argument. This address is therefore calculated by subtracting from pointer pp 40 the value of delta (student, person) as stored in person vtbl 28.

In a similar fashion to the illustration of student object 31 in FIG. 3, FIG. 4 illustrates the memory layout of employee object 41. The first portion of the layout comprises data specific to the class employee. It starts with vtbl pointer 42 which points to employee vtbl 45. Next, the layout includes vbase pointer 33 which points to the second portion of the layout of employee object 41, namely person sub-object 36. Person sub-object 36 comprises vtbl pointer 22 which points to person vtbl 29, and the entries for the data members of sub-class person, namely firstname 23, lastname 24 and age 25. After vbase pointer 33, the memory layout of employee object 41 includes the specific data members of class employee, namely, company 43, and salary 44.

Employee vtbl 45 contains the address of the appropriate version of the print function which is to be called when it is invoked with employee object 41 as its argument, namely&employee::print. In addition, person vtbl 29 not only contains the address&employee::print, but also contains the offset that is used to find the address of the derived class object (employee object 41), given the address of the base class sub-object (person sub-object 36). This value is delta (student,person), which is equal to the difference between the address of vtbl pointer 22 and vtbl pointer 42 in employee object 41.

As pointed out above, because person is declared as a virtual base class of student, references to the person component of a student object require an indirection through a pointer, called the vbase pointer. In the case of student object 31 and employee object 41 as illustrated in FIG. 3 and FIG. 4, respectively, this indirection may seem unnecessary. In these cases, there is only one vbase pointer, which could therefore readily be replaced by a fixed offset. Such indirection is required, however, in order to implement sharing of a virtual base class in objects of types specified using multiple inheritance.

FIG. 5 illustrates the memory layout of student_employee object 51, a class for which such multiple inheritance is specified. In particular, the illustrated memory layout of student_employee object 51 begins with the representation of employee sub-object 57, which appears as it does in FIG. 4. Specifically, it comprises vtbl pointer 42, which points to employee/student_employee vtbl 54. Employee/student_employee vtbl 54 contains the address of the appropriate version of the print function which is to be called when it is invoked with student_employee object 51 as its argument, namely&student_employee::print. Note that the same vtbl is used for the employee sub-object as is used for the student_employee object as a whole. This optimization is utilized in most C++ implementations. Specifically, it enables the sharing of the vtbl of a derived class object with its first non-virtual base class sub-object, since both objects can be assigned the same address. It is as a result of this optimization that the specific data member for the student_employee object itself is deferred to later in the memory layout.

After vtbl pointer 52 there is a first instance of vbase pointer 33 pointing to the portion of student_employee object 51 which represents the person sub-object, namely, person sub-object 36. Following this are data members company 43 and salary 44, which are the data members specific to employee sub-object 57. Next is the representation of student sub-object 58, which appears as it does in FIG. 3. Specifically, it includes vtbl pointer 32, a second instance of vbase pointer 33, and the specific data member of the student sub-object, university 34. Vtbl pointer 32 points to student vtbl 55 which contains the address of the appropriate version of the print function to be called when it is invoked with student_employee object 51 as its argument, namely&student_employee::print. The second instance of base pointer 33 also points to the portion of student_employee object 51 which represents the person sub-object, person sub-object 36. Note that in order to implement virtual base class sharing, it is necessary for both instances of vbase pointer 33 to point to the same person sub-object 36.

Following student sub-object 58 is the specific data member for the student_employee object itself, maxhours 53. Finally, the single representation of the person sub-object, person sub-object 36, appears, including vtbl pointer 22 pointing to person vtbl 56, which once again contains the address of the appropriate version of the print function to be called when it is invoked with student_employee object 51 as its argument, namely &student_employee::print.

Persistence and the Hidden Pointers Problem

As described above, the ability to save data objects, e.g., on disk, and later to retrieve them in a subsequent program invocation requires that the data objects be persistent. In other words, they must remain valid across program invocations. Virtual functions and virtual base classes have an impact on persistence because of the hidden vtbl and vbase pointers generated by C++ compilers in implementing these facilities. As seen above, virtual function invocations involve indirections that uses vtbl pointers to access entries in the virtual function tables. References to the components of virtual base classes must follow vbase pointers. The vtbl and vbase pointers are hidden pointers because they represent implementation related information and are invisible to the user. In other words, there is no mechanism in C++ by which the user can directly manipulate these pointers.

Unfortunately, hidden pointers are volatile since they are not valid beyond the invocation of the program that created them. Saving objects containing hidden pointers on disk and subsequently reading these objects back into memory in another program (or in a subsequent invocation of the same program) will result in the hidden pointers becoming invalid. Absent these pointers being "fixed", a reference to a virtual function or a component of a virtual base class will likely lead to an illegal (if not nonsensical) memory reference. Of course, the same observation holds true for the values of data members that are themselves volatile pointers. But in the case of data members, the programmer can ensure that they are not used as pointers with invalid values. For example, alternative representations (e.g., indices) may be used. The programmer is fully aware of the existence of these data members and can directly manipulate them in such a manner so as to avoid any memory reference problem. In the case of hidden pointers, however, the user has no such direct control.

Fixing the Hidden Pointers with a Modified Object Creation Process

In accordance with an illustrative embodiment of the present invention, a method is provided for making data objects with hidden pointers persistent. In particular, each data object of a user-defined class is created in an object oriented language by applying some pre-existing object creation process. In C++ this process is known as the new operator. The method of one illustrative embodiment of the present invention involves the modification of this object creation process to limit the functionality thereof. This modified process is then applied to data objects which have been read into memory (e.g., from disk) by a program invocation subsequent to the program invocation that created the data objects.

Figure 6:
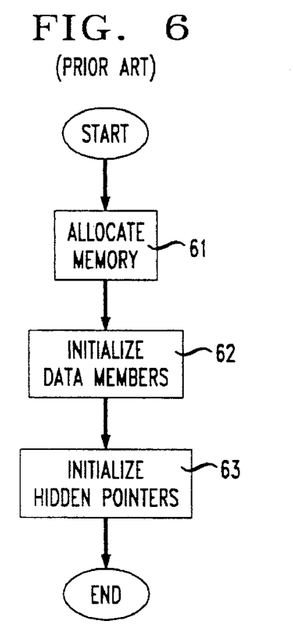
FIG. 6 illustrates the typical operation of the object creation process which results from the application of the new operator in C++.

The normal operation of the object creation process which results from the invocation of the new operator in C++ is illustrated in FIG. 6. Step 61 comprises the allocation of the appropriate quantity of memory space (e.g., by assigning memory space from free storage areas such as the "heap") as is required to represent the given data object. (See, for example, FIGS. 2–5.) This quantity of memory is readily determined based on the specification of the class as provided by the user.

Step 62 comprises initialization of the data members of the class (and of any sub-classes) in the memory space allocated. This step is optional in that the user may or may not provide information as to which data members are to be initialized and to what values, whenever a new data object is created. In C++, such initialization is typically accomplished by invoking a user-supplied initialization routine, known as a "constructor." If the user does not supply any such constructor, the data members will not be initialized to any particular values upon the object's creation.

Finally, step 63 comprises the initialization of all hidden pointers contained in the data object, and, if necessary, the creation of any corresponding virtual function tables. This step requires no information from the user beyond that contained in the specification of the class (and of any sub-classes). The C++ run-time system will know to what address each of these pointers must point, based on the class specification and the system's own arrangement of various information (e.g., the code of the virtual functions) in its own memory space.

The order of performance of step 62 and step 63 is of no importance. The execution of the new operator may perform either step first or may even intertwine them. In particular, the combination of step 62 and step 63 is often considered to be the application of the (overall) constructor for the given data object. Specifically, the C++ compiler adds the code necessary to implement step 63 to the user supplied constructor for performing step 62. If no user supplied constructor exists, the resultant constructor consists only of the added code.

Figure 7:
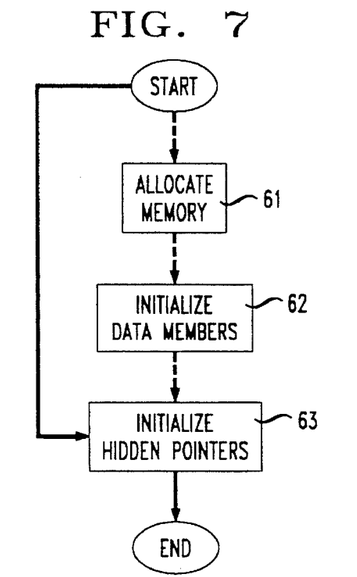
FIG. 7 illustrates a modification to the object creation process according to an illustrative embodiment of the present invention.

FIG. 7 illustrates a modification to be made to the object creation process (i.e., the functionality of applying the new operator) according to one illustrative embodiment of the present invention. In particular, step 61 and step 62 are avoided, and only step 63 is performed in the modified version of the process. In this manner, the hidden pointers are advantageously initialized to valid address values, and yet no new data object is created (i.e., no memory is allocated). Moreover, the values of the data members of the data object are left intact.

Figure 8:
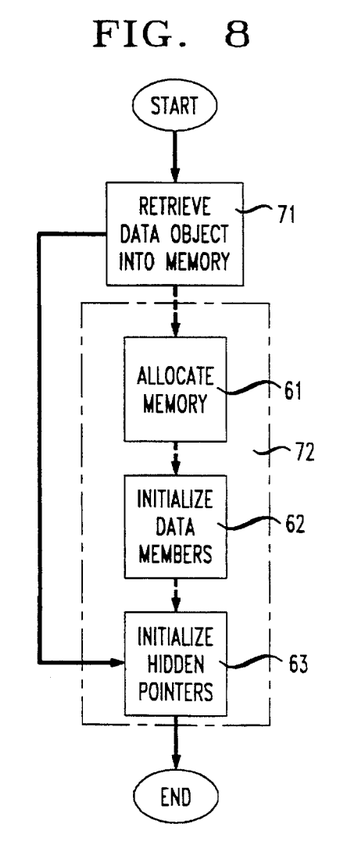
FIG. 8 illustrates the application of the modified object creation process of FIG. 7 to previously created data objects according to an illustrative embodiment of the present invention.

FIG. 8 illustrates the application of the modified object creation process of FIG. 7 to data objects which have been retrieved into memory by a program invocation subsequent to the one that created the data object. In particular, step 71 retrieves the previously created data object into memory. As a result, the desired object is in memory, even though it contains invalid pointers. Then, modified object creation process 72, which comprises only step 63 (and not step 61 or step 62), is applied to the data object to fix the hidden pointers.

In accordance with another aspect of the present invention, the process illustrated in FIG. 7 may be created directly without modifying an existing object creation process. Specifically, hidden pointers contained in existing data objects are initialized without allocating new memory or disturbing the contents of data members within the objects. In this manner, a process equivalent to that created by the modification procedure described above is produced. That is, the process comprises step 63 as shown in FIG. 7. This directly created process may be applied to existing data objects to fix hidden pointers as illustrated in FIG. 8, in the same manner as described above for the modified object creation process.

C++ Implementation of the Modified Object Creation Process

As pointed out above, the operator new is the C++ object creation mechanism. Therefore, it is necessary to modify the normal process of invoking this operator to avoid the allocation of memory and the initialization of data members.

To avoid the allocation of memory the new operator is overloaded by defining a new version of operator new. As is well known by C++ programmers of ordinary skill, a function name is said to be "overloaded" when it has two or more distinct meanings. Specifically, the intended meaning of any particular use is determined by its context. In C++, two or more functions can be given the same name provided that each signature (argument structure) is unique, in either the number or the data types of their arguments.

In particular, the address of the location where the retrieved data object has been stored will be passed to this new version of operator new. The function will merely return this same address as its result, without allocating any new storage. The function call will, however, cause the appropriate constructor to be invoked. The following C++ code defines the overloaded operator new:

```
class _ode ( );
void* operator new(size_t, _ode *p)
{
    return (void *) p;
}
```

Class_ode is a unique data type defined to ensure that the overloaded definition of new is invoked. Note that C++ requires that the first parameter of an overloaded definition of function operator new to be of type size_t and also requires that new return a value of type void *.

Suppose, for example, that p points to an employee object that has been retrieved into memory. Then the overloaded definition of operator new is applied to the given employee object by the following line of C++ code:

```
new ((_ode *) p) employee;
```

This invocation of operator new will not allocate any new storage, but it will invoke the argumentless constructor for class employee. To avoid the initialization of data members in the data object, therefore, the constructor must be modified so that it will not execute any user specified constructor code (if any exists) when it is called. In this manner it will only initialize the hidden pointers. This is advantageously achieved by defining a global variable_fix_hidden which will operate as a flag to indicate whether or not the constructor is being invoked only to fix hidden pointers. This variable may be declared, for example, by the following line of C++ code:

```
short _fix_hidden;
```

The _fix_hidden flag will be used to distinguish between the case where the constructor is being invoked by the modified object creation process (i.e., the overloaded operator new) and where it is being invoked by the original unmodified object creation process. In particular, assume that a class D defines a user specified constructor of the following form:

```
D::D(parameter-declarations_opt)
{
    . . .
}
```

The subscript opt indicates that the parameter declarations are optional, since a constructor function may or may not have arguments. This constructor, as well as all other user specified constructors, are transformed as follows:

```
D::D(parameter-declarations_opt)
{
    if (!_fix_hidden) {
        . . .
    }
}
```

This transformation thereby ensures that if the global variable _fix_hidden is set (i.e., is non-zero), then no user specified code will be executed when the constructor is called. Therefore, none of the data members of the retrieved object will be modified (i.e., they will not be initialized). However, it is also necessary to ensure that any initializers present in a constructor definition do not modify any data members. As is well known by C++ programmers of ordinary skill, initializers are given just before the constructor body as follows:

```
D::D(parameter-declarations_opt) initializer-list
{
    . . .
}
```

Initializers may be used to initialize the data members of the object as well as base class components (by another constructor call). Initializers that are themselves constructor calls need not be modified, since these constructor functions will themselves have been modified to execute conditionally based on the value of the global variable _fix_hidden. But those initializers which specify an initial value for a data member are modified to change the value of the data member only if the constructor is being called to initialize a newly created object and not to fix hidden pointers for an object that has been retrieved into memory. For example, an initializer of the form

```
m(initial-value)
``` where m is a data member, will be transformed to the following initializer:

```
m(_fix_hidden ?m: initial-value)
```

In this manner, when the global flag variable _fix_hidden is set, the initializer effectively assigns the member to itself, thus leaving the current value of the data member intact.

The initialization of hidden pointers, that is, the modified object creation process 72 as shown in FIG. 8, may be thus encapsulated in a single member function, reinit, that is generated for each class. For example, the body of the reinit function for class student_employee might comprise the following C++ code:

```
extern short _fix_hidden;
void student_employee::reinit(void* p)
{
    _fix_hidden = 1;
    new ((_ode *)p) student_employee;
    _fix_hidden = 0;
}
```

In particular, function reinit sets the global variable _fix_hidden to 1 before invoking the overloaded version of the new operator (which does not allocate any storage). Any constructors that will be invoked as a result of the new operator call will find _fix_hidden set and thus will neither execute any user specified code in the constructor nor modify any data member values through initializers. The only effect will be to fix the hidden pointers by changing their addresses to the appropriate values. Function reinit then sets the global variable _fix_hidden back to 0 before returning.

In the foregoing discussion, primary reference to object-oriented languages and practices has illustratively been through the C++ language and practices, but it will be understood that other object-oriented contexts may be substituted in appropriate cases. In addition, each reference to a compiler should be deemed to include translators, interpreters and any other means by which source code is processed, thereby directly or indirectly resulting in the execution of the specified functionality.

Although a specific embodiment of this invention has been shown and described herein, it is to be understood that this embodiment is merely illustrative of many possible specific arrangements which can be devised to represent application of the principles of the invention. Numerous and varied other arrangements can be devised in accordance with these principles by those of ordinary skill in the art without departing from the spirit and scope of the invention.

We claim:

1. An automated method performed by a data processing system for processing a preexisting data object, the data object having a pointer for use in providing memory access to information associated with the data object, the pointer having become invalid, said method comprising the steps of determining a location of said associated information in a memory; and changing said invalid pointer to refer to the determined location in the memory, wherein said changing step comprises applying a modified object creation process to said preexisting data object to perform said changing of said invalid pointer, wherein an object creation process has been modified to form said modified object creation process, said object creation process comprising the steps of allocating memory space in a memory for a data object being created, initializing data within said data object being created, and initializing pointers within said data object being created, and wherein said modification comprises selectively inhibiting said step of allocating memory space and said step of initializing data.

2. An automated method performed by a data processing system for processing a preexisting data object, the data object having a pointer for use in providing memory access to information associated with the data object, the pointer having become invalid, said method comprising the steps of determining a location of said associated information in a memory; and changing said invalid pointer to refer to the determined location in the memory, wherein said preexisting data object was created by an object creation process within the execution of a first program invocation, and wherein said changing step comprises applying a modified object creation process to said preexisting data object to perform said changing of said invalid pointer, wherein said applying said modified object creation process is performed within the execution of a second program invocation.

3. The method of claim 2 wherein said invalid pointer is a hidden pointer.

4. The method of claim 2 wherein said object creation process comprises program executable code reflecting program source code written in an object-oriented programming language.

5. The method of claim 4 wherein said object-oriented programming language comprises the C++ programming language and said program source code comprises the new operator.

6. The method of claim 4 wherein said modified object creation process comprises program executable code reflecting program source code comprising an overloaded version of the new operator.

7. The method of claim 6 wherein said invalid pointer is a hidden pointer, said object-oriented programming language comprises the C++ programming language and said program source code comprises the new operator.

8. The method of claim 1 wherein said object creation process further comprises an invocation of a user-defined initialization process for said initialization of data, and wherein said modification of said object creation process further comprises modifying said user-defined initialization process to selectively inhibit said initialization of data when said user-defined initialization process is invoked by said modified object creation process.

9. The method of claim 8 wherein said applying said modified object creation process comprises setting a global variable to a predetermined value, and wherein said modifying said user-defined initialization process comprises selectively inhibiting said initialization of data when said global variable has been set to said predetermined value.

10. The method of claim 9 wherein said preexisting data object was created by said object creation process within the execution of a first program invocation, and wherein said applying said modified object creation process is performed within the execution of a second program invocation.

11. The method of claim 10 wherein said invalid pointer is a hidden pointer.

12. The method of claim 10 wherein said object creation process comprises program executable code reflecting program source code written in an object-oriented programming language.

13. The method of claim 12 wherein said object-oriented programming language comprises the C++ programming language and said program source code comprises the new operator.

14. The method of claim 12 wherein said modified object creation process comprises program executable code reflecting program source code comprising an overloaded version of the new operator.

15. The method of claim 14 wherein said invalid pointer is a hidden pointer, said object-oriented programming language comprises the C++ programming language and said program source code comprises the new operator.

16. An automated method performed by a data processing system for processing a preexisting data object, the data object having a pointer for use in providing memory access to information associated with the data object, the pointer having become invalid, said method comprising the steps of determining a location of said associated information in a memory; and changing said invalid pointer to refer to the determined location in the memory, wherein said changing step comprises applying a modified object creation process to said preexisting data object to perform said changing of said invalid pointer, wherein an object creation process has been modified to form said modified object creation process, said object creation process comprising the steps of allocating memory space in a memory for a data object being created and initializing pointers within said data object being created, and wherein said modification comprises selectively inhibiting said step of allocating memory space.

17. The method of claim 16 wherein said preexisting data object was created by said object creation process within the execution of a first program invocation, and wherein said applying said modified object creation process is performed within the execution of a second program invocation.

18. The method of claim 17 wherein said invalid pointer is a hidden pointer.

19. The method of claim 17 wherein said object creation process comprises program executable code reflecting program source code written in an object-oriented programming language.

20. The method of claim 19 wherein said object-oriented programming language comprises the C++ programming language and said program source code comprises the new operator.

21. The method of claim 19 wherein said modified object creation process comprises program executable code reflecting program source code comprising an overloaded version of the new operator.

22. The method of claim 21 wherein said invalid pointer is a hidden pointer, said object-oriented programming language comprises the C++ programming language and said program source code comprises the new operator.

* * * * *